(12) United States Patent
Feng et al.

(10) Patent No.: US 10,088,070 B2
(45) Date of Patent: Oct. 2, 2018

(54) MAGNETIC FLOOR DRAIN

(71) Applicant: Jinrong Zhang, Taizhou (CN)

(72) Inventors: Tao Feng, Taizhou (CN); Jinrong Zhang, Taizhou (CN); Xiang Feng, Taizhou (CN)

(*) Notice: Subject to any disclaimer, the term of this patent is extended or adjusted under 35 U.S.C. 154(b) by 0 days.

(21) Appl. No.: 15/836,859

(22) Filed: Dec. 9, 2017

(65) Prior Publication Data
US 2018/0100602 A1    Apr. 12, 2018

Related U.S. Application Data

(63) Continuation of application No. PCT/CN2016/087272, filed on Jun. 27, 2016.

(30) Foreign Application Priority Data

Jun. 29, 2015  (CN) .......................... 2015 1 0365767
Nov. 19, 2015  (CN) ...................... 2015 2 0913447 U

(51) Int. Cl.
*F16K 31/08*  (2006.01)
*E03F 5/04*  (2006.01)
*F16K 1/20*  (2006.01)

(52) U.S. Cl.
CPC .......... *F16K 31/088* (2013.01); *E03F 5/0407* (2013.01); *F16K 1/2007* (2013.01); *F16K 1/2042* (2013.01); *E03F 2005/0417* (2013.01)

(58) Field of Classification Search
CPC .... F16K 31/088; F16K 1/2007; F16K 1/2042; E03F 5/0407; E03F 2005/0417

USPC ........................................................... 251/65
See application file for complete search history.

(56) References Cited

U.S. PATENT DOCUMENTS

| | | | | |
|---|---|---|---|---|
| 468,985 | A | * | 2/1892 | Downs .................... F16K 15/03 137/527 |
| 2,346,904 | A | * | 4/1944 | Carlson ................. F16K 31/088 251/65 |
| 3,891,000 | A | * | 6/1975 | Melnick ................. F16K 15/03 137/855 |

(Continued)

FOREIGN PATENT DOCUMENTS

| CN | 101509269 A | 8/2009 |
|---|---|---|
| CN | 102031810 A | 4/2011 |

(Continued)

*Primary Examiner* — Umashankar Venkatesan
(74) *Attorney, Agent, or Firm* — Wayne & Ken, LLC; Tony Hom

(57) ABSTRACT

The present disclosure discloses a magnetic floor drain, comprising a floor drain body and a sealing cover. A straight-through water outlet is provided at a lower part of the floor drain body. A locating surface is provided at one side of the water outlet. At least one fixed magnetic block is provided on the locating surface and all the fixed magnetic blocks are provided in an interval arrangement. One side of the sealing cover is connected flexibly to the locating surface through a hinge structure. At the same time, a movable magnetic block is provided at the hinged side of the sealing cover. Centers of the fixed magnetic block and the movable magnetic block are both located on the axis of the hinge structure. The present disclosure provides an adjustable draining which is simple and useful, convenient to assemble and few accessories needed.

10 Claims, 11 Drawing Sheets

(56) References Cited

U.S. PATENT DOCUMENTS

| | | | | | |
|---|---|---|---|---|---|
| 4,427,025 | A | * | 1/1984 | Prince | F16K 15/033 137/527 |
| 4,556,083 | A | * | 12/1985 | Schleiter, Sr. | F16K 15/033 137/514 |
| 6,112,764 | A | * | 9/2000 | Engdahl | F16K 17/36 137/38 |
| 2006/0081292 | A1 | * | 4/2006 | Sarno | F16K 15/033 137/527 |

FOREIGN PATENT DOCUMENTS

| | | |
|---|---|---|
| CN | 103410213 A | 11/2013 |
| CN | 104947785 A | 9/2015 |
| CN | 204703287 U | 10/2015 |

\* cited by examiner

MAGNETIC FLOOR DRAIN

TECHNICAL FIELD

The present disclosure relates to a floor drain, and more specifically, to a magnetic floor drain.

BACKGROUND

The application No. CN2013103905824 discloses a directly-connected combination magnetic floor drain, which overcomes a decrease in a suction force with a downward movement during a draining of a prior magnetic floor drain. The prevention avoids effectively losing efficacy of reset of a sealing cover. However, a structure of the disclosure has over-numbered accessories and the structure is complex and difficult to assemble. At the same time, the magnetic structure is provided inside the floor drain body, causing blocking when the magnetic structure attracts a magnetic impurity easily during draining. The most important thing is that the draining still relies on the gap produced by a downward movement of a sealing cover between the sealing cover and a floor drain body, which still cannot satisfy a need of a large amount of drainage in a short time in reality and has a potential safety risk during usage.

SUMMARY

Aiming to solve the problems mentioned above, the present disclosure discloses a magnetic floor drain. An adaptive drainage by a floor drain is able to be achieved under the basis of not decreasing a reset force of a sealing cover during the drainage. A structure of the magnetic floor drain is simple and useful, convenient to assemble and few accessories needed.

In order to achieve the objectives mentioned above, the present disclosure adopts the following technical solutions.

A magnetic floor drain comprises a floor drain body and a sealing cover; wherein a straight-through water outlet is provided at a lower part of the floor drain body. A locating surface is provided at one side of the water outlet. At least one fixed magnetic block is provided on the locating surface and all the fixed magnetic blocks are provided in an interval arrangement. One side of the sealing cover is movably connected to the locating surface of the floor drain body through a hinge structure. A movable magnetic block is provided at a hinged side of the sealing cover. Centers of the fixed magnetic block and the movable magnetic block are both located on an axis of the hinge structure. The water outlet is closely sealed by the sealing cover with a reset force generated between the fixed magnetic block and the movable magnetic block by the principle that different magnetic poles attract and same magnetic poles repel each other.

Further, each movable magnetic block corresponds to one fixed magnetic block, or each two movable magnetic blocks correspond to one fixed magnetic block and the two movable magnetic blocks are respectively distributed at two sides of the fixed magnetic block, or each movable magnetic block corresponds to two fixed magnetic blocks and the movable magnetic block is located between the two fixed magnetic blocks.

Further, magnetic poles of the fixed magnetic block and the movable magnetic block are provided at an upper end and a lower end, and the magnetic poles of the fixed magnetic block and the movable magnetic block at a same end are different and attracted.

Further, the fixed magnetic block is inclined to the sealing cover with a fixed angle so that the fixed angle between the fixed magnetic block and the movable magnetic block is staggered on an axis circumference relative to the hinge structure.

Further, the magnetic poles of the movable magnetic block are provided at an upper end and a lower end of the movable magnetic block and the magnetic poles of the fixed magnetic block are provided at a front side and a rear side of the movable magnetic block. The magnetic pole of the fixed magnetic block close to a side of the sealing cover and the magnetic pole at the upper end of the movable magnetic block are different and attracted. Or the magnetic poles of the fixed magnetic block are provided at the upper end and the lower end of the movable magnetic block and the magnetic poles of the movable magnetic block are provided at the front side and the rear side of the movable magnetic block; and the magnetic pole of the movable magnetic block close to a side of the sealing cover and the magnetic pole at the top of the fixed magnetic block are same and repelled.

Further, the fixed magnetic block is provided inclined to the sealing cover with a fixed angle so that the fixed angle between the fixed magnetic block and the movable magnetic block is staggered on an axis circumference relative to the hinge structure.

Further, the fixed magnetic block and the movable magnetic block have a square, circular arc, circular or equilateral polygon shape.

Further, the hinge structure comprises two connecting columns and two clamping pins located on the axis of the hinge structure. The two connecting columns are provided at intervals on the locating surface. A neck with an opening facing outside is provided on each connecting column. The two clamping pins are provided on the lateral side of the sealing cover and are respectively locked in the necks with opening facing outside to hinge flexibly to the floor drain body.

Further, the fixed magnetic block is completely wrapped by an installation base and is located on the locating surface of the floor drain body. The movable magnetic block is completely wrapped by a connecting base and is located at the lateral side of the sealing cover. The installation base and the connecting base are provided close to and staggered with each other on the axis of the two clamping pins.

Further, an arc cover is provided between a lower part of the connecting column and the sealing cover to completely separate the fixed magnetic block and the movable magnetic block from the drainage from the water outlet.

The magnetic floor drain is movably connected to the locating surface of the floor drain body through the hinge structure provided at one side in the present disclosure. A magnetic reset structure comprising a fixed magnetic block and a movable magnetic block is provided at the hinged place of the floor drain body and the locating surface.

The magnetic reset structure comprising the fixed magnetic block and the movable magnetic block is completed provided at the outside of the floor drain body. The provided arc cover covers the water-outlet side of the fixed magnetic block and the movable magnetic block, avoiding a contact of the fixed magnetic block as well as the movable magnetic block with flowing water in the floor drain body. Therefore, no magnetic impurities in the floor drain body will be attracted in this structure, preventing effectively a block situation at the water outlet of the floor drain body.

Furthermore, square, circular, circular arc, or equivalent polygonal shape is adopted for both the fixed magnetic block and the movable magnetic block. The centers of the fixed magnetic block and the movable magnetic block are provided correspondingly on the axis of the hinge structure, which prevents a reset force produced between the fixed magnetic block and the movable magnetic block from decreasing when the sealing cover is turned open relative to a hinge point. In an original state, the magnetic poles at the upper ends of the fixed magnetic block and the movable magnetic block are different and attracted (or one at the top ends and the other at the front end are different and attracted), so the sealing cover seals closely the water outlet of the floor drain body. Also, the movable magnetic block is synchronously turned when the sealing cover is turned with the hinge point. The turning of the movable magnetic block will induce a decrease in the attraction force due to an increased distance between the different poles at one end of the fixed magnetic block and movable magnetic block, however, an increase in repulsive force will take place at the same time due to a decreased distance between the same poles at the other end of the fixed magnetic block and movable magnetic block. Therefore the reset force is not decreased with the turning of the sealing cover in an integrated view.

In usage, the sealing cover will not be opened if a pressure of the drainage is not able to overcome a reset force between the fixed magnetic block and the movable magnetic block. The floor drain body will store some water and form a water sealing, resisting bugs as well as odors. While if the pressure of the drainage is stronger than the reset force between the fixed magnetic block and the movable magnetic block, the whole sealing cover will be turned around the hinge structure at its lateral side and will induce a gradual opening of the water outlet of the floor drain body to drain water. The opening process will stop until an equilibrium is again obtained between the pressure of the drainage and the reset force. The sealing cover is maintained still, with a drainage outlet formed by a gap between the sealing cover and the water outlet of the floor drain body. The size of the drainage outlet is proportional to a drainage pressure. The less amount of the drainage, the smaller of the drainage outlet; the more amount of the drainage, the larger of the drainage outlet until the sealing cover is fully open. The structure design, which adjusts a size of the drainage outlet with a drainage amount, can effectively avoids an odor from back-flushing induced by an over-large size of the drainage outlet. When the drainage pressure is not able to overcome the reset force by a decrease in the drainage amount, the sealing cover is gradually closed under the reset force until the drainage is over and the water outlet of the floor drain body is again completely sealed by the sealing cover.

Moreover, the integrated structure of the present disclosure only consists of the floor drain body, the sealing cover, the fixed magnetic block and the movable magnetic block, which is simple with few accessories. At the same time, the connection column, the installation base, and the connecting base, related to an assembling, are all external structures, and greatly facilitates the installation and the assembling of the sealing cover and the floor drain body.

DETAILED DESCRIPTION

Embodiment 1

Figure 1:
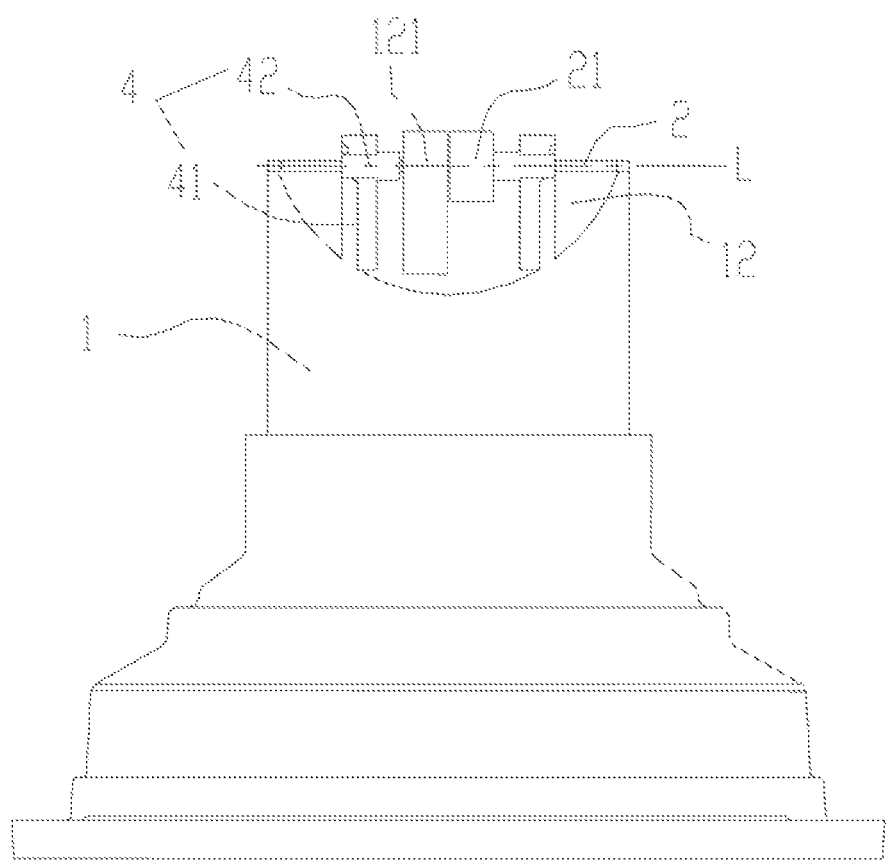
FIG. 1 shows a structural schematic diagram of the present disclosure.
Figure 2:
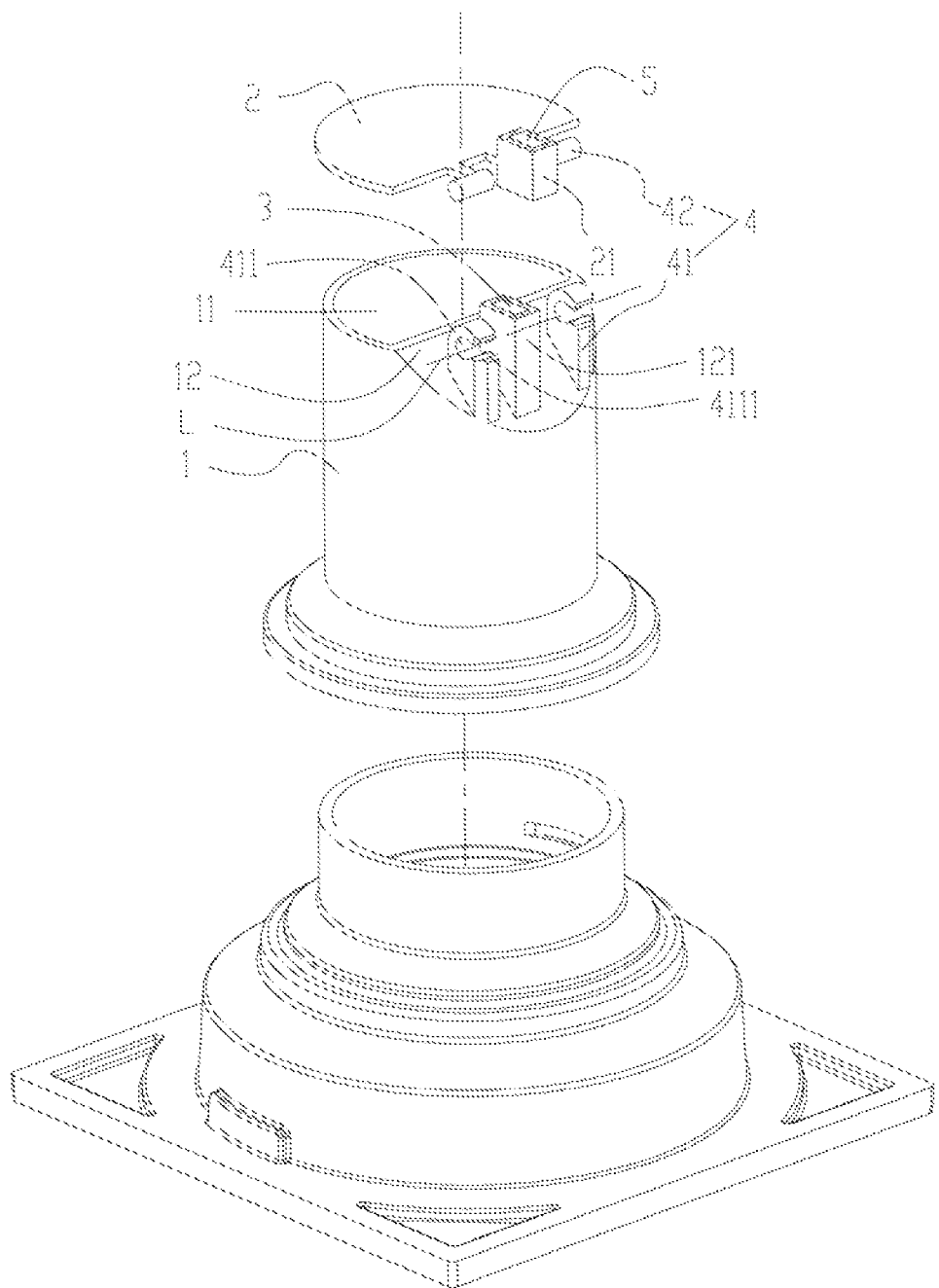
FIG. 2 shows an exploded schematic diagram of a perspective structure of the present disclosure.
Figure 3:
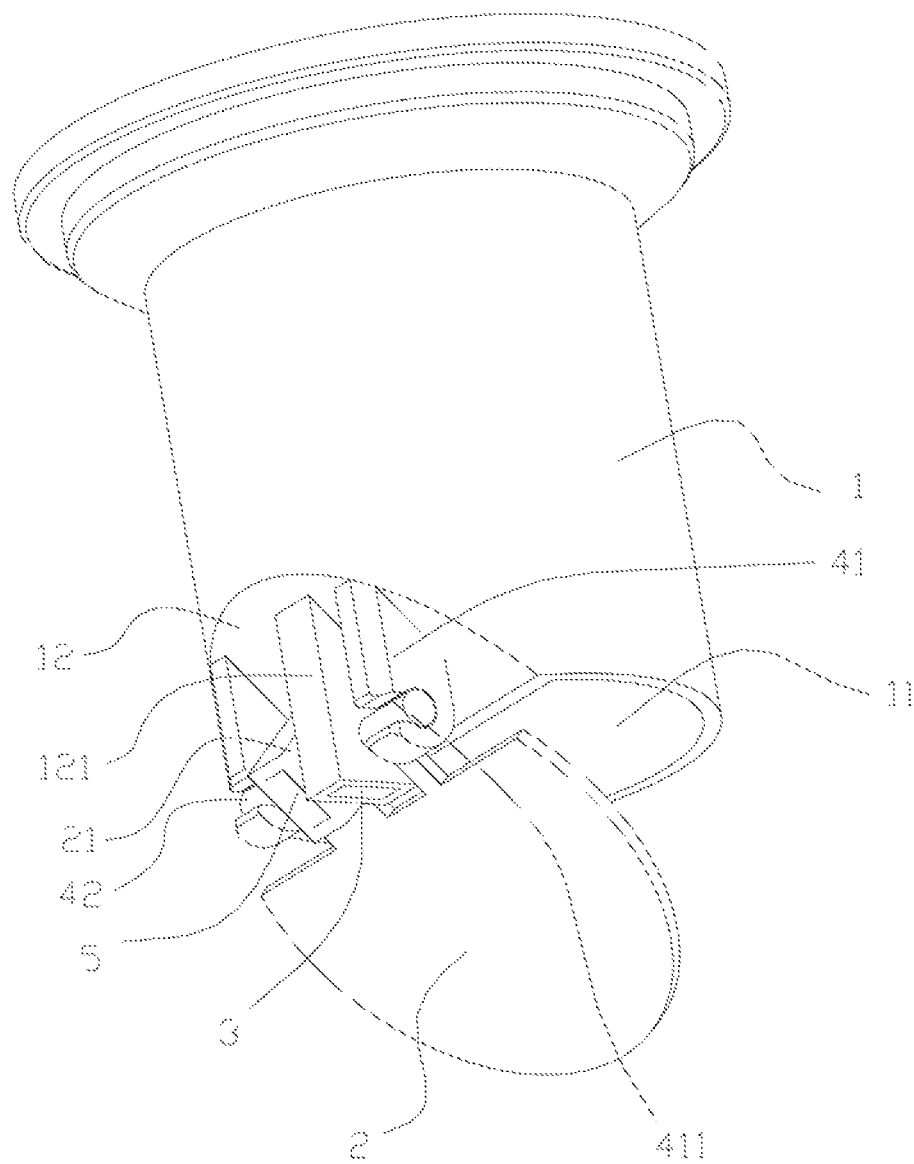
FIG. 3 shows a perspective structural schematic diagram of the present disclosure when the sealing cover is open.

As shown in FIG. 1, FIG. 2 and FIG. 3, the magnetic floor drain comprises the floor drain body 1 and the sealing cover 2. A straight-through water outlet 11 is provided at a lower part of the floor drain body 1. A locating surface 12 is provided at one side of the water outlet 11 and at least one fixed magnetic block 3 is provided on the locating surface 12 and all the fixed magnetic blocks 3 are provided in interval arrangement. One fixed magnetic block is provided in this embodiment, but in reality two or more magnetic blocks can be provided according to a size of the sealing cover 2. One side of the sealing cover 2 is connected movably to the locating surface 12 of the floor drain body 1 through a hinge structure 4. At the same time, a movable magnetic block 5 is provided at the hinged side of the sealing cover 2. Centers of the fixed magnetic block 3 and the movable magnetic block 5 are both located on the axis L of the hinge structure 4. The water outlet 11 is closely sealed by the sealing cover 2 with a reset force generated between the fixed magnetic block 3 and the movable magnetic block 5 by the principle that different magnetic poles attract and same magnetic poles repel each other.

Figure 4:
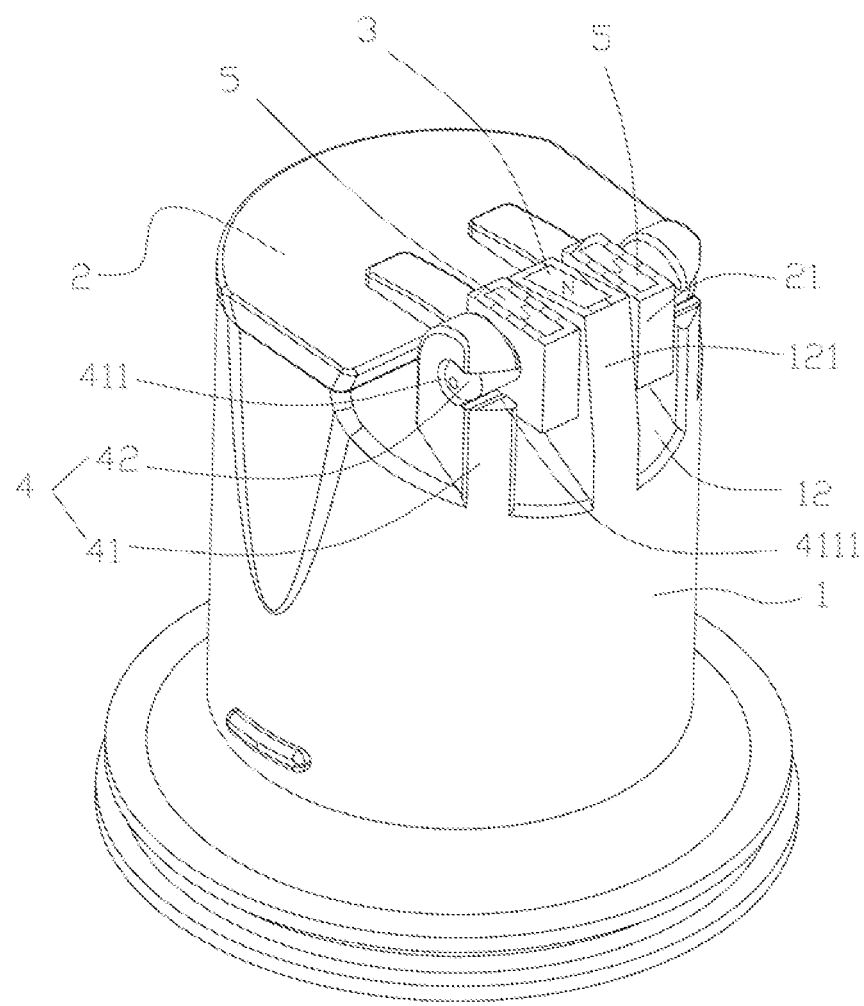
FIG. 4 shows a structural schematic diagram of the present disclosure with a fixed magnetic block and two corresponding movable magnetic blocks.
Figure 9:
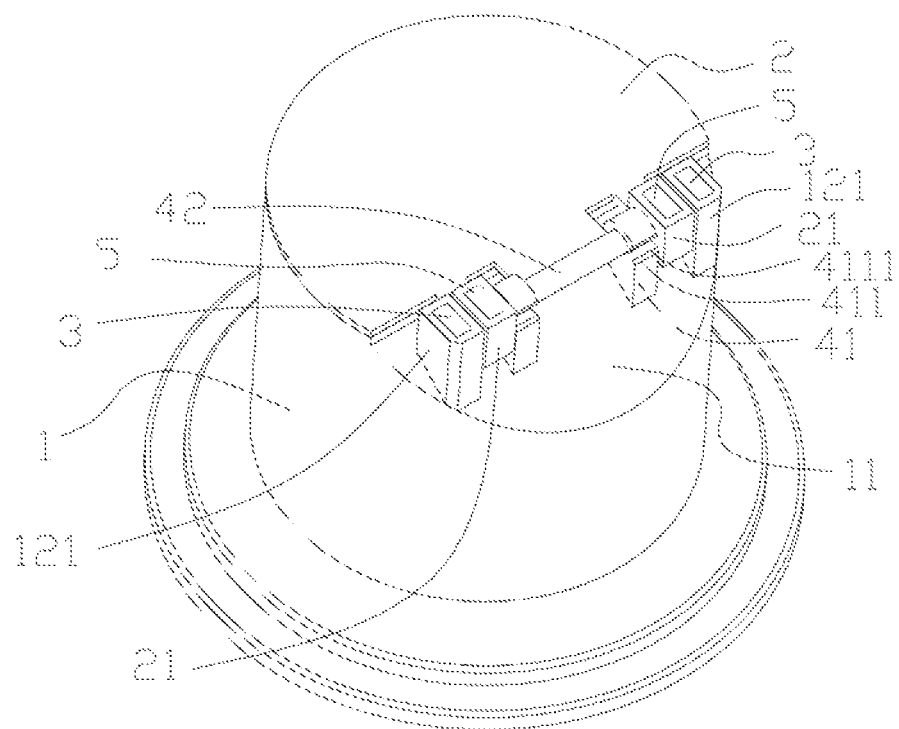
FIG. 9 shows a perspective structural schematic diagram of the present disclosure where two fixed magnetic blocks are provided and correspond with the movable magnetic block.

In the embodiment, each movable magnetic block 5 corresponds to one fixed magnetic block 3 as shown in FIG. 3. While FIG. 9 shows perspective structural schematic diagram where two fixed magnetic blocks 5 are provided and correspond with the movable magnetic block 3. In the real provision, it is also possible that each two movable magnetic blocks 5 correspond to one fixed magnetic block 3 and the two movable magnetic blocks 5 are respectively distributed at two sides of the fixed magnetic block 3. Or each movable magnetic block 5 corresponds to two fixed magnetic blocks 3 and the movable magnetic block 5 is located between the two fixed magnetic blocks 3, as shown in FIG. 4.

Figure 5:
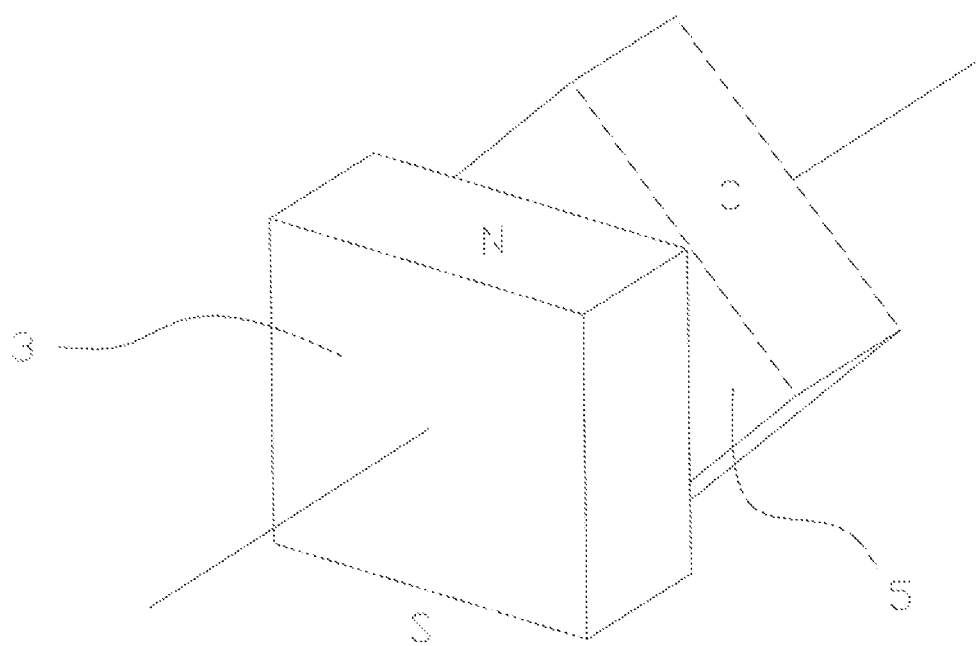
FIG. 5 shows a schematic diagram of a structural layout of the fixed magnetic block and the movable magnetic block of the present disclosure.

Herein, the magnetic poles of the fixed magnetic block and the movable magnetic block are provided at the upper end and the lower end of the fixed magnetic block 3 as well as the movable magnetic block 5, and magnetic poles of the fixed magnetic block and the movable magnetic block at a same end are different and attracted, as shown in FIG. 5. In the embodiment, the upper end of the magnetic pole in the movable magnetic block is N, while the lower end thereof is S; the upper end of the magnetic pole in the corresponding fixed magnetic block is S, while the lower end thereof is N. In reality, the poles at the upper ends and the lower ends can be exchanged in the fixed magnetic block and the movable magnetic block.

Figure 6:
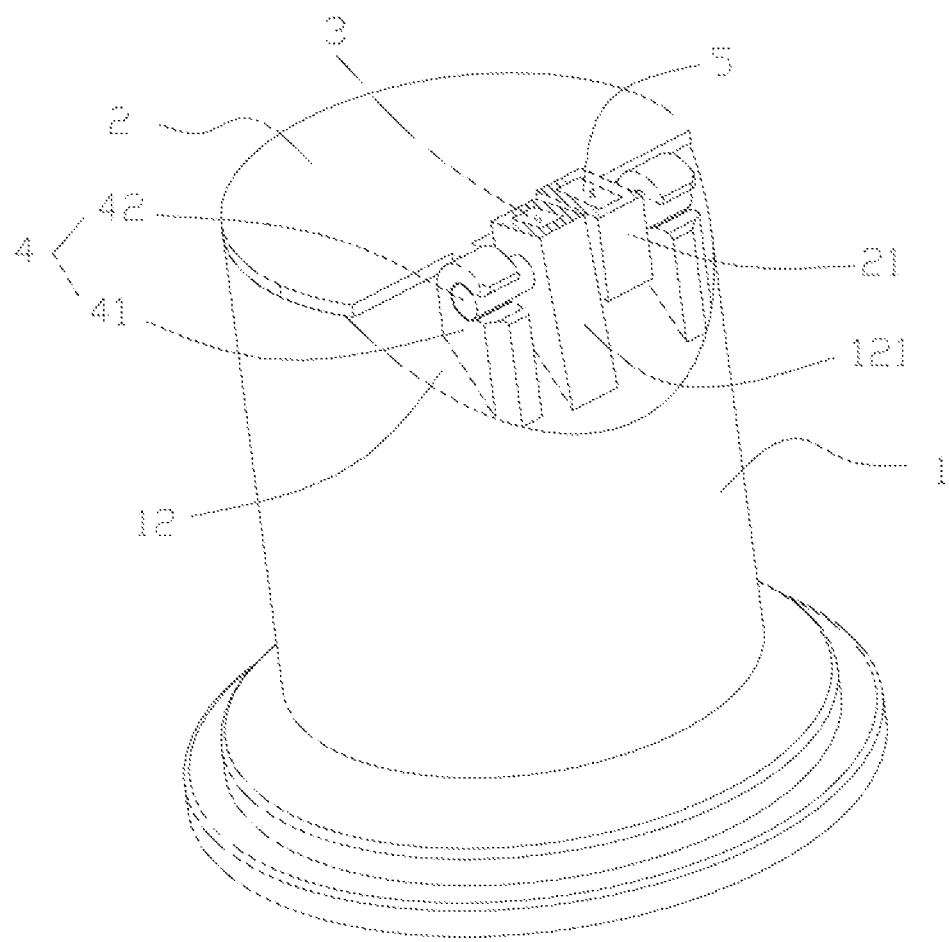
FIG. 6 shows a perspective structural schematic diagram of the present disclosure where the fixed magnetic block is inclined to the sealing cover.

Herein, to ensure sealing performance of the sealing cover 2, the fixed magnetic block 3 is provided inclined to the sealing cover 2 with a fixed angle so that a fixed angle between the fixed magnetic block 3 and the movable magnetic block 5 is staggered on an axis circumference relative to the hinge structure 4. The structure thereof is shown in FIG. 6. The structure enables the movable magnetic block 5 to have a trend of continuing reset all over time, so that the sealing cover 2 covers tightly over the water outlet 11 and forms an effective sealing.

The hinge structure 4 comprises two connecting columns 41 and two clamping pins 42 located on the axis of the hinge structure L; wherein the two connecting columns 41 are provided at intervals on the locating surface 12. A neck 411 with an opening facing outside 4111 is provided on each connecting column 41. The two clamping pins 42 are provided on the lateral side of the sealing cover 2 and are respectively locked in the necks 411 with opening facing outside to hinge flexibly to the floor drain body 1.

The fixed magnetic block 3 is completely wrapped by an installation base 121 and is located on the locating surface 12 of the floor drain body 1.

The movable magnetic block 5 is completely wrapped by a connecting base 21 and is located at the lateral side of the sealing cover 2; the installation base 121 and the connecting base 21 are provided close to and staggered with each other on the axis of the two clamping pins 42.

Embodiment 2

Figure 7:
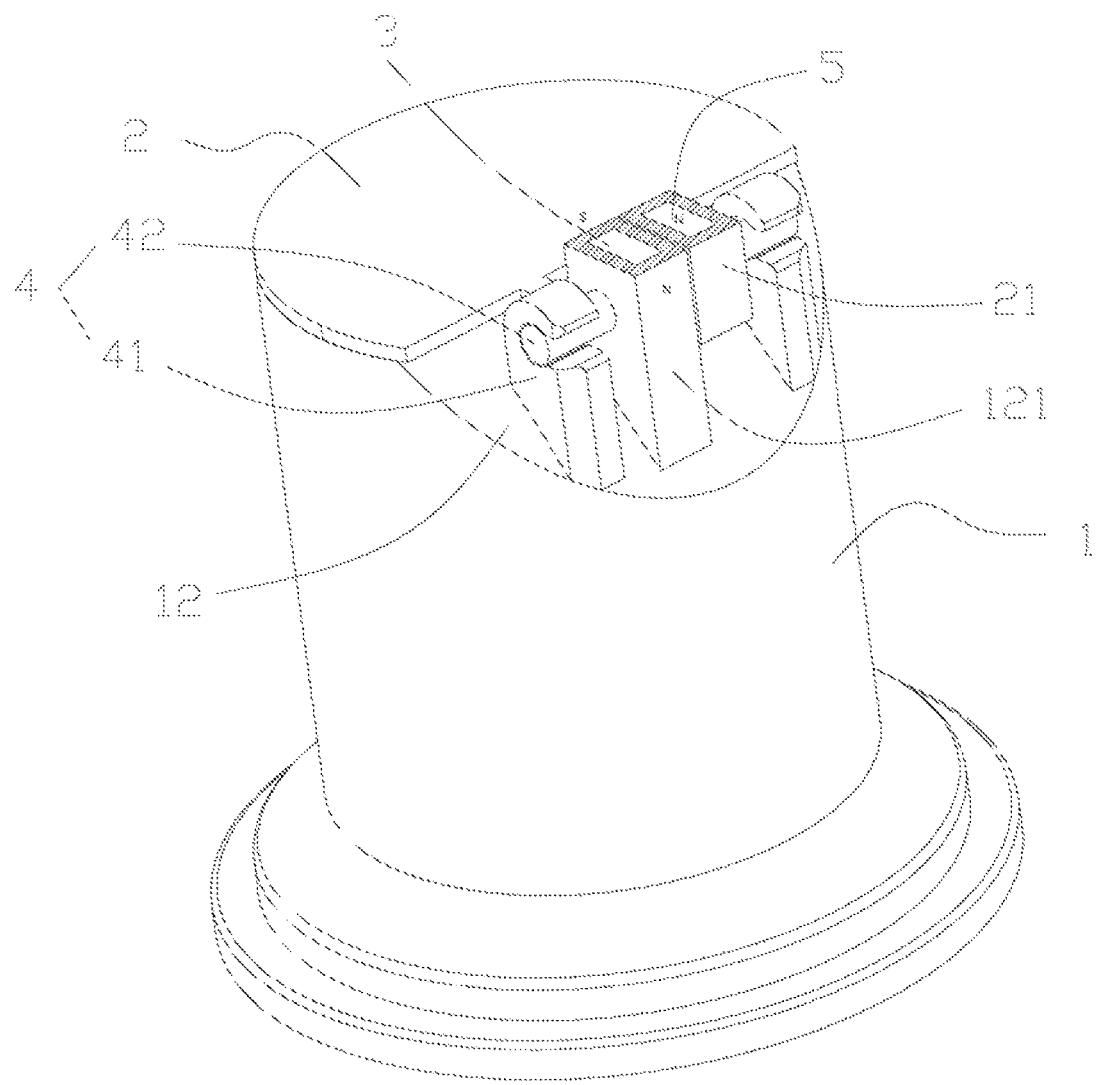
FIG. 7 shows a perspective structural schematic diagram of the present disclosure where magnetic poles of the fixed magnetic block are distributed at the upper end and lower end of the fixed magnetic block, and magnetic poles of the movable magnetic block are distributed at the front side and rear side of the movable magnetic block.

Herein, FIG. 7 is shown as the second embodiment of the present disclosure, wherein the magnetic poles are provided at an upper and a lower end of the movable magnetic block 5 and the magnetic poles are provided at a front side and a rear side of the fixed magnetic block 3. The magnetic pole of the fixed magnetic block 3 close to a side of the sealing cover 2 is different from and is attracted to the magnetic pole at the upper end of the movable magnetic block 5. Poles layout can be certainly exchanged in the fixed magnetic block and the movable magnetic block. Namely, the magnetic poles are provided at a front side and a rear side of the movable magnetic block 5 and the magnetic poles are provided at the upper end and lower end of the fixed magnetic block 3; the magnetic pole of the movable magnetic block 5 close to a side of the sealing cover and the magnetic pole at the upper end of the fixed magnetic block 3 are same and repelled.

Figure 8:
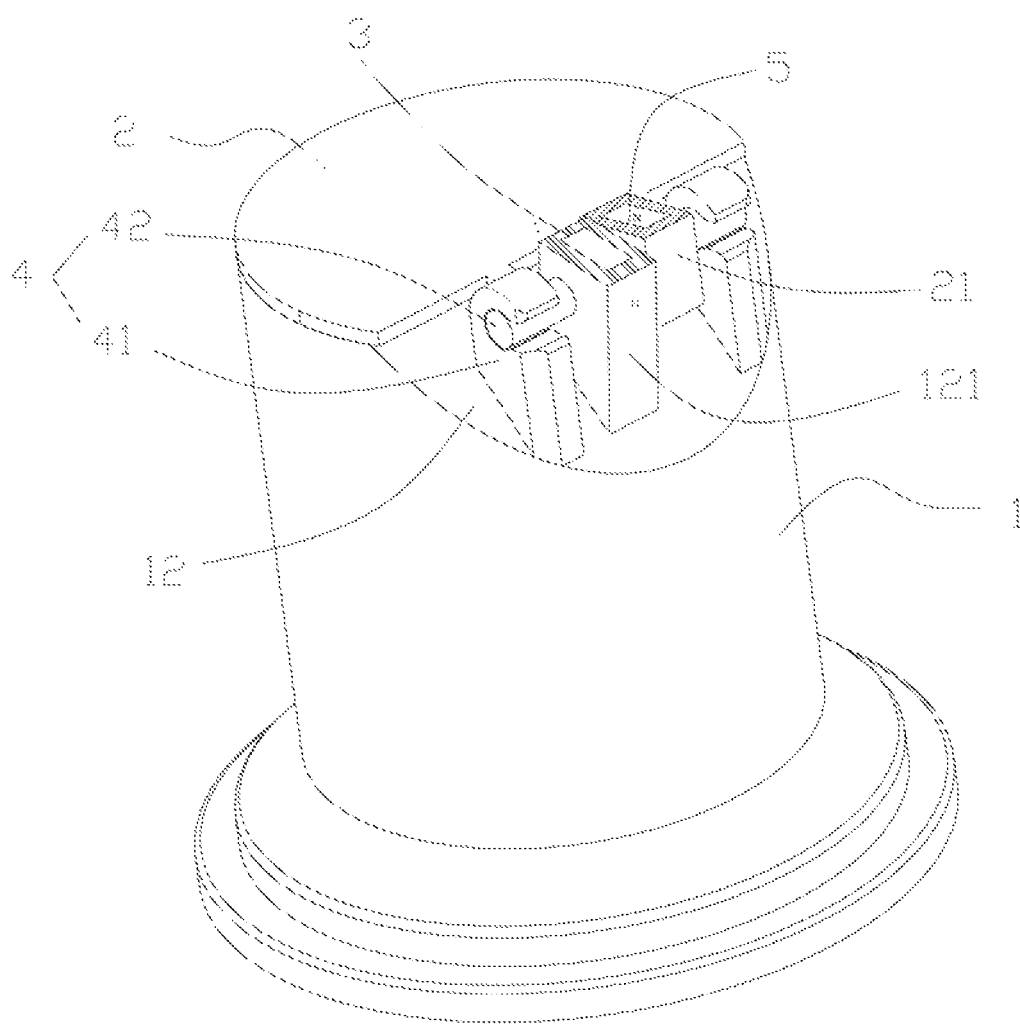
FIG. 8 shows a perspective structural schematic diagram of the present disclosure where the fixed magnetic block is inclined to the outside.

Similarly, the fixed magnetic block 3 is provided inclined to the sealing cover with a fixed angle so that a fixed angle between the fixed magnetic block 3 and the movable magnetic block 5 is staggered on an axis circumference relative to the hinge structure 4, the structure thereof is shown in FIG. 8. The structure enables the movable magnetic block 5 to have a trend of continuing reset all over time, so that the sealing cover 2 covers tightly over the water outlet 11 and forms an effective sealing.

Summing up, the magnetic floor drain is movably connected to the locating surface 12 of the floor drain body 1 through the hinge structure 4 provided at one side in the present disclosure. A magnetic reset structure comprising a fixed magnetic block 3 and a movable magnetic block 5 is provided at the hinged place of the floor drain body 1 and the locating surface 12.

Herein, given to stabilization of the reset force during usage, square, circular, circular arc or equivalent polygonal shape is adopted for both the fixed magnetic block 3 and the movable magnetic block 5. The centers of the fixed magnetic block 3 and the movable magnetic block 5 are provided correspondingly on the axis of the hinge structure 4, which prevents a reset force produced between the fixed magnetic block 3 and the movable magnetic block 5 from decreasing when the sealing cover 2 is turned open relative to a hinge point.

In an original state, the poles at the upper ends of the fixed magnetic block 3 and the movable magnetic block 5 are different and attracted (or one at the upper end and the other at the front end are different and attracted), so the sealing cover 2 seals closely the water outlet 11 of the floor drain body 1. Also, the movable magnetic block 5 is synchronously turned when the sealing cover 2 is turned with the hinge point. The turning of the movable magnetic block 5 will induce a decrease in the attraction force due to an increased distance between the different poles at one end of the fixed magnetic block 3 and movable magnetic block 5, however, an increase in repulsive force will take place at the same time due to a decreased distance between the same poles at the other end of the fixed magnetic block 3 and movable magnetic block 5. Therefore the reset force is not decreased with the turning of the sealing cover 2 in an integrated view.

In usage, the sealing cover 2 will not be opened if a pressure of the drainage is not able to overcome a reset force between the fixed magnetic block 3 and the movable magnetic block 5. The floor drain body 1 will store some water and form a water sealing, resisting bugs as well as odors. While if the pressure of the drainage is stronger than the reset force between the fixed magnetic block 3 and the movable magnetic block 5, the whole sealing cover 2 will be turned around the hinge structure 4 at its lateral side and will induce a gradual opening of the water outlet 11 of the floor drain body 1 to drain water. The opening process will stop until an equilibrium is again obtained between the pressure of the drainage and the reset force. The sealing cover 2 is maintained still, with a drainage outlet formed by a gap between the sealing cover 2 and the water outlet 11 of the floor drain body. The size of the drainage outlet is proportional to a drainage pressure. The less amount of the drainage, the smaller of the drainage outlet; the more amount of the drainage, the larger of a size of the drainage outlet until the sealing cover is fully open. The structure design, which adjusts a size of the drainage outlet with a drainage amount, can effectively avoids an odor from back-flushing induced by an over-large size of the drainage outlet. When the drainage pressure is not able to overcome the reset force by a decrease in the drainage amount, the sealing cover 2 is gradually closed under the reset force until the drainage is over and the water outlet 11 of the floor drain body 1 is again completely sealed by the sealing cover 2.

Herein, the magnetic reset structure comprising of the fixed magnetic block 3 and the movable magnetic block 5 is completed provided at the outside of the floor drain body 1. The magnetic reset structure does not contact with flowing water in the floor drain body 1. Therefore, no magnetic impurities in the floor drain body 1 will be attracted in this structure, preventing effectively a block situation at the aqua-holes of the floor drain body 1, and ensuring the water outlet to be unobstructed.

Figure 10:
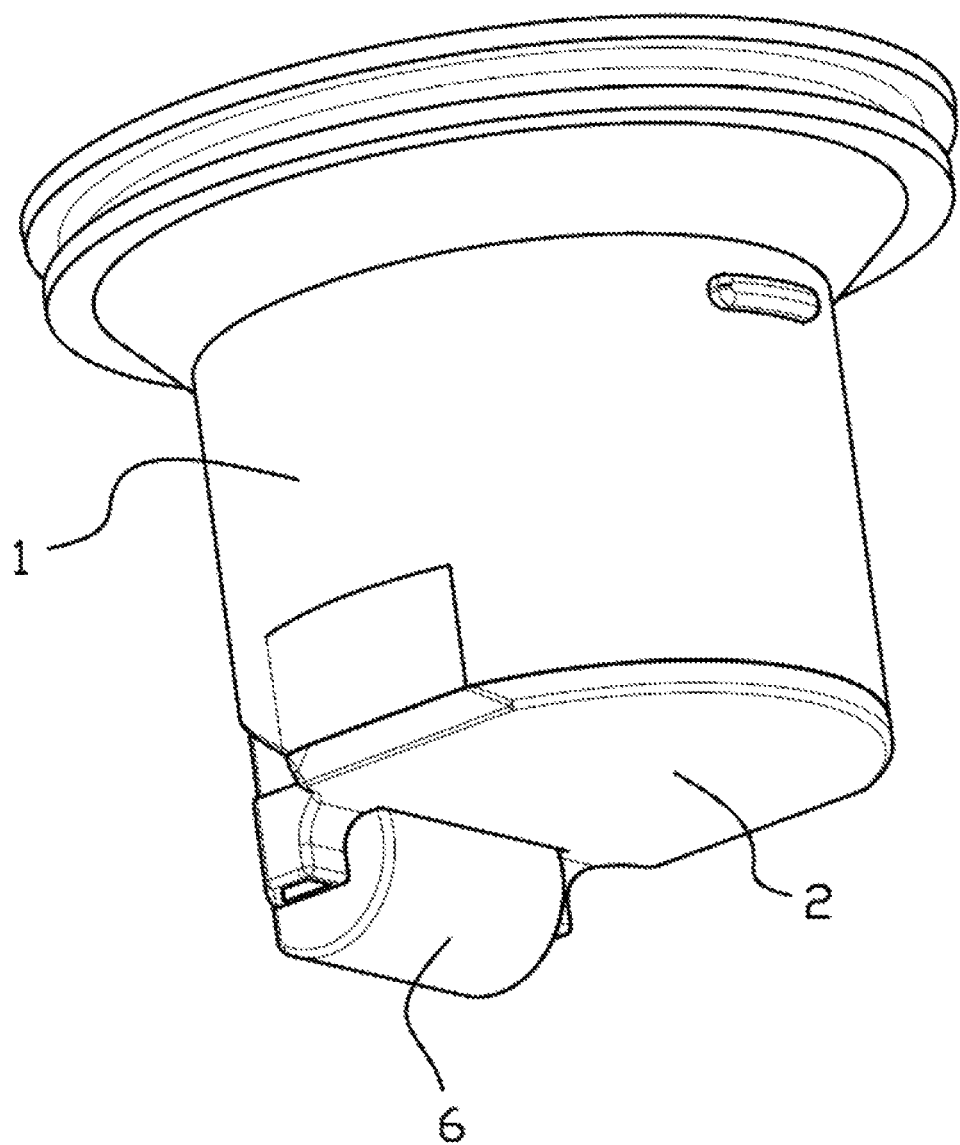
FIG. 10 shows a perspective structural schematic diagram of the present disclosure where an arc cover is provided at a water-outlet side for the fixed magnetic block and the movable magnetic block.
Figure 11:
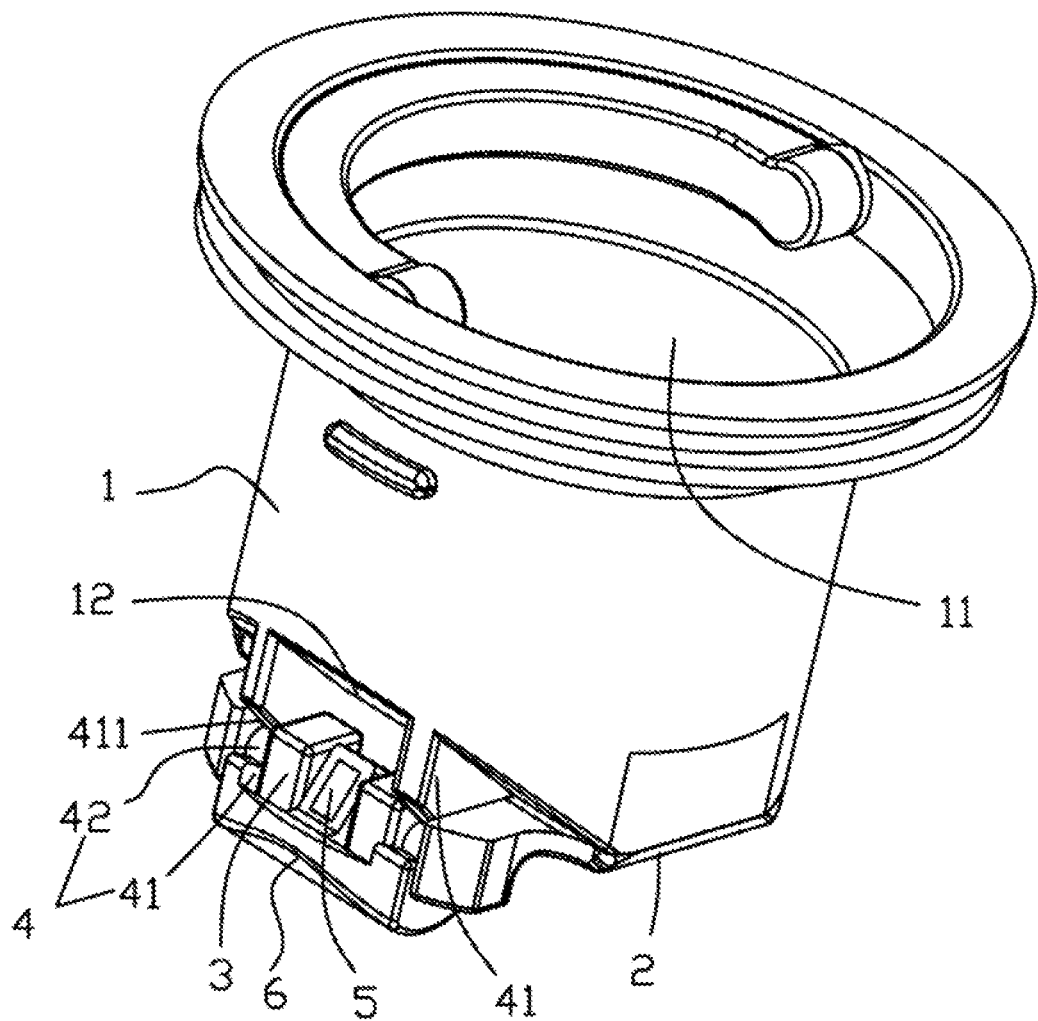
FIG. 11 shows a perspective structural schematic diagram of the present disclosure where an arc cover is provided at a water-outlet side for the fixed magnetic block and the movable magnetic block.

In order to fundamentally isolate the contact between the fixed magnetic block 3, the movable magnetic block 5 and the water outlet 11 of the floor drain body 1, as shown in FIG. 10 and FIG. 11, an arc cover 6 is provided between the lower part of the connecting column 41 and the sealing cover 2 to completely separate the fixed magnetic block 3 and the movable magnetic block 5 from the drainage from the water outlet 11. The arc cover 6 is able to completely separate the fixed magnetic block 3 and the movable magnetic block 5 from the drainage from the water outlet 11, which solves the problems fundamentally of the fixed magnetic block 3 and the movable magnetic block 5 contacting with the water outlet 11 and attracting magnetic impurities. Hair accumulation and blocking are prevented at the water outlet 11, so that a successful opening and reset of the sealing cover 2 are ensured.

Moreover, the integrated structure of the present disclosure only consists of the floor drain body 1, the sealing cover 2, the fixed magnetic block 3 and the movable magnetic block 5, which is simple with few accessories. At the same time, the connection column 41, the clamping pin 42, the installation base 121, and the connecting base 21, related to an assembling, are all external structures, and greatly facilitates the installation and the assembling of the sealing cover 2 and the floor drain body 1.

The above contents are only preferred embodiments of the present disclosure, but are not intended to limit the present disclosure. Any simple modification, equivalent replacement, embellishment and the like made within spirits and principles of the present invention shall be included in the protection scope of the present disclosure.

What is claimed is:

1. A magnetic floor drain, comprising:
a floor drain body and a sealing cover;
wherein a straight-through water outlet is provided at a lower part of the floor drain body; a locating surface is provided at one side of the water outlet; at least one fixed magnetic block is provided on the locating surface and the at least one fixed magnetic blocks is provided in an interval arrangement;
one side of the sealing cover is movably connected to the locating surface of the floor drain body through a hinge structure;
at least one movable magnetic block is provided at a hinged side of the sealing cover;
a plurality of centers of the at least one fixed magnetic block and the at least one movable magnetic block are located on an axis of the hinge structure;
the water outlet is closely sealed by the sealing cover with a reset force generated between the at least one fixed magnetic block and the at least one movable magnetic block by the principle that different magnetic poles attract and same magnetic poles repel each other.

2. The magnetic floor drain according to claim 1, wherein the at least one movable magnetic block and the at least one fixed magnetic block are arranged in one of the following manners,
one movable magnetic block corresponds to one fixed magnetic block, or
two movable magnetic blocks correspond to one fixed magnetic block and the two movable magnetic blocks are respectively distributed at two sides of said one fixed magnetic block, or
one movable magnetic block corresponds to two fixed magnetic blocks and said one movable magnetic block is located between the two fixed magnetic blocks.

3. The magnetic floor drain according to claim 2, wherein magnetic poles of the at least one fixed magnetic block and the at least one movable magnetic block are provided at an upper end and a lower end, and the magnetic poles of the at least one fixed magnetic block and the at least one movable magnetic block at a same end are different and attracted.

4. The magnetic floor drain according to claim 3, wherein the at least one fixed magnetic block is inclined to the sealing cover with a first fixed angle so that a second fixed angle between the at least one fixed magnetic block and the at least one movable magnetic block is staggered on an axis circumference relative to the hinge structure.

5. The magnetic floor drain according to claim 2, wherein the magnetic poles of the at least one movable magnetic block are provided at an upper end and a lower end of the movable magnetic block and the magnetic poles of the at least one fixed magnetic block are provided at a front side and a rear side of the at least one fixed magnetic block; the magnetic pole of the at least one fixed magnetic block close to a side of the sealing cover and the magnetic pole at the upper end of the at least one movable magnetic block are different and attracted; or
the magnetic poles of the at least one fixed magnetic block are provided at an upper end and a lower end of the at least one fixed magnetic block and the magnetic poles of the at least one movable magnetic block are provided at a front side and a rear side of the at least one movable magnetic block; and the magnetic pole of the at least one movable magnetic block close to the side of the sealing cover and the magnetic pole at the top of the fixed magnetic block are same and repelled.

6. The magnetic floor drain according to claim 5, wherein the at least one fixed magnetic block is inclined to the sealing cover with a first fixed angle so that a second fixed angle between the at least one fixed magnetic block and the at least one movable magnetic block is staggered on an axis circumference relative to the hinge structure.

7. The magnetic floor drain according to claim 1, wherein the at least one fixed magnetic block and the at least one movable magnetic block have a square, circular arc, circular or equilateral polygon shape.

8. The magnetic floor drain according to claim 1, wherein the hinge structure comprises two connecting columns and two clamping pins located on the axis of the hinge structure; the two connecting columns are provided at intervals on the locating surface; a neck with an opening facing outside is provided on each connecting column; the two clamping pins are provided on a lateral side of the sealing cover and are respectively locked in the necks with opening facing outside to hinge flexibly to the floor drain body.

9. The magnetic floor drain according to claim 1, wherein the at least one fixed magnetic block is completely wrapped by an installation base and is located on the locating surface of the floor drain body; the at least one movable magnetic block is completely wrapped by a connecting base and is located at a lateral side of the sealing cover; the installation base and the connecting base are provided close to and staggered with each other on an axis of two clamping pins.

10. The magnetic floor drain according to claim 8, wherein an arc cover is provided between a lower part of each connecting column and the sealing cover to completely separate the at least one fixed magnetic block and the at least one movable magnetic block for the drainage from the water outlet.

* * * * *